United States Patent Office 3,384,602
Patented May 21, 1968

3,384,602
BONDED MOLECULAR SIEVE CATALYSTS AND PREPARATION OF THE SAME
Alfred J. Robinson, South Plainfield, N.J., assignor, by mesne assignments, to Engelhard Minerals & Chemicals Corporation, Newark, N.J., a corporation of Delaware
No Drawing. Filed Mar. 24, 1965, Ser. No. 442,498
5 Claims. (Cl. 252—455)

ABSTRACT OF THE DISCLOSURE

Mechanically strong zeolitic molecular sieve catalyst particles are formed by blending finely divided particles of zeolitic molecular sieve with a substantial amount of halloysite clay and sufficient dilute sodium hydroxide solution to form a plastic mixture. The mixture is formed into particles by means such as extrusion and the particles are heated at a temperature within the range of about 100° F. to 300° F., ion-exchanged with nonalkali metal ions and calcined.

---

This invention relates to binding molecular sieves and is directed, especially, to binding crystalline zeolitic molecular sieves for the purpose of preparing catalysts containing finely divided zeolitic molecular sieve uniformly dispersed in a porous matrix-binder.

The term "molecular sieve" is used to describe certain zeolitic metal aluminosilicates which possess unique adsorptive properties. Some zeolitic molecular sieves, such as faujasite, are naturally occurring, but most molecular sieves must be obtained by synthesizing the sieve from suitable sources of alkali metal oxide, silicon oxide and alumina. The synthesis of molecular sieves usually entails precipitating a hydrated alkali metal form of the zeolite from a dilute aqueous reaction medium, and then filtering and washing the resulting micron size hydrated crystals. One use of the molecular sieve crystals, especially crystals of synthetic molecular sieves having relatively large pore openings, is as an ingredient in the preparation of high activity catalyst composites. As described in U.S. 3,140,249 and 3,140,251, both to Charles L. Plank and Edward J. Rosinski, composite molecular sieve catalysts are produced in the form of mechanically strong agglomerates composed of ion-exchanged micron-size particles of sieve distributed in a porous oxide gel matrix. To prepare these sieves, as described in the patents, the precipitated micron-size sieve crystals are ion-exchanged to replace sodium ions with suitable cations, and the ion-exchanged crystals are mixed with a siliceous hydrosol which is allowed to set to form a hydrogel having sieve incorporated therein. The composite is then heat-treated to convert the hydrosol to desired gel form and to dehydrate and activate the sieve.

Still another type of composite molecular sieve agglomerate is formed by binding molecular sieve with clay, described in U.S. 2,973,327 to William J. Mitchell and Ward F. Moore. The bonded molecular sieves are prepared by mixing molecular sieve with a plastic clay and the mixture is tempered with water and fashioned into particles such as pellets. The clay is used in small amount as compared to the sieve, preferably to constitute from 10% to 25% by weight of the final pellets. The pellets are hardened by heat-setting the clay binder. The pelleted molecular sieve product obtained by binding zeolitic molecular sieve crystals with clay, as described in said patent, are useful as absorbents and satisfy the hardness requirements for many adsorptive contact processes. Especially hard agglomerates are obtained when the binding clay is attapulgite clay, which is a colloidal magnesium aluminosilicate clay, and the agglomerates are formed by tumbling the ingredients until spheres are formed.

It has also been suggested (U.S. 2,140,253 to Charles J. Plank and Edward J. Rosinski) to use similar clays to form a matrix binder for molecular sieve catalysts. An advantage of using clay is that catalysts made with a porous clay matrix are less expensive than similar catalysts made with synthetic gel matrices. It has been found, however, that even when large pore size molecular sieves are selected and such sieves are ion-exchanged with suitable cations, the clay-bonded molecular sieve agglomerates are unfit for use in catalyst conversion units because their harness is entirely inadequate to meet industry specifications for high grade catalysts. These specifications are considerably more stringent than the requirements for commercial adsorbents. To illustrate, in measuring the ball-mill hardness of adsorbents, as set forth in U.S. 2,973,327, referred to hereinabove, the adsorbent is tumbled for 15 minutes with seven relatively small steel balls ($\frac{1}{2}''$ diameter). The absorbent product is assigned a ball mill hardness index number representing the percentage of material surviving such test. In contrast, ball mill hardness tests, as generally tested by the cracking catalyst industry, utilize a tumbling period of at least one hour, and four balls, each $\frac{15}{16}''$ diameter, are employed. The latter conditions are obviously markedly more severe since the catalyst charge is subjected to a much greater mechanical force and for a longer period of time than is used in testing adsorbents. Grade A catalyst, when evaluated by the 4-ball mill hardness test, should have a hardness of at least 95%. Similarly, the air jet attrition test for adsorbents, as described in said patent, is carried out by subjecting pellets to an air blast under controlled conditions for 30 minutes. In testing catalysts by a similar procedure, a strong air blast of 6.1 c.f.m. is used. Experience has shown that the catalyst air jet attrition test should be carried out for at least 4 hours to obtain an air jet attrition index that will be indicative of the expected performance of the catalyst. In the case of pelleted cracking catalyst, at least about 80% of the pellets should survive such a test.

A comparison of the hardness tests for adsorbents with the tests for catalysts clearly indicate that composite molecular sieve pellets which may be sufficiently hard for use as an adsorbent may be completely unsatisfactory as catalysts and fall far short of the air jet and/or ball mill hardness requirements for commercial catalysts. Thus, while certain clays are eminently suitable in binding molecular sieve crystals to make composites suitable for use in adsorptive contact processes, as set forth in U.S. 2,973,-327, to the best of my knowledge these clays have not been successfully employed in binding sieve crystals to make catalyst composites.

To improve the mechanical bond between the solids in clay-bonded molecular sieve agglomerates intended for use in catalytic conversion units, it has been suggested to incorporate various additives with the ingredients. Some of the additives were unsuitable since they adversely affected the catalytic activity of the product. Other additives that were suggested chemically attacked the sieve and were unsuitable for this reason. Still another approach, which entailed the use of hydrosol additive to the clay, initially seemed to improve hardness without deleterious effect on catalytic properties. However, prolonged air jet hardness tests showed that the pellets underwent an abrupt loss of substantially complete mechanical strength after four hours. The pellets therefore acted much like eggshells, since their hardness appeared to be confined to the superficial layer of the pellets. In use, the pellets would have been attrited into usless fines after a fairly short period of time.

It is the principal object of the present invention to provide composite catalysts containing a molecular sieve in a porous clay matrix-binder which possess noteworthy mechanical stability.

It is another object of this invention to improve the hardness of agglomerated clay-bonded molecular sieve catalysts without materially affecting the catalytic properties of the composites.

I have discovered a method for improving the hardness of catalyst agglomerates composed of crystalline molecular sieve in a dehydrated clay matrix-binder. This method entails the use of a particular type of plastic clay, namely a clay of the kaolin type and containing an appreciable quantity of the clay mineral halloysite, herein referred to as "halloysitic kaolin clay." In accordance with my invention, this particular type of clay is used with a dilute sodium hydroxide solution as the liquid agent to temper the mixture of sieve and clay into a mass having a plastic consistency and thereby to permit the formation of agglomerates. An important feature of my process is that the alkali is reacted with the hydrated clay in the agglomerates by heating the agglomerates at low temperature (100°–300° F.). In this manner, the originally plastic agglomerates are hardened at least to the extent that they resist slaking when contacted with an aqueous solution of ion-exchange material, as hereinafter described. This hardening is believed to result from the formation in situ of an amorphous sodium aluminum silicate zeolite of the nonsieve type and to accur through the agglomerates, including the core of the agglomerates. The unusual absorptivity of halloysite is believed to prevent chemical attack and decomposition of the sieve crystals by the alkali. After being heated to effect partial hardening, the agglomerates are contacted with an aqueous solution containing nonalkali cations, e.g., hydrogen, ammonium or metals of Group I–B to Group VIII of the Periodic Table, or mixtures thereof, until substantially all of the alkali content of the agglomerates, including the alkali in the matrix-binder, is removed. The agglomerates are then heated at a temperature of at least 1000° F., but at a temperature below which the sieve is unstable, to activate the agglomerates and to dehydrate the clay and impart porosity to the clay. This heat treatment hardens further the agglomerates, resulting in the formation of masses which satisfy industry requirements as to hardness.

From this brief description of my invention, it can be seen that an essential feature of the process resides in the use of sodium hydroxide solution to form a low temperature bond for finely divided crystals of a zeolite by reaction with clay. The sodium content is removed, however, before the ultimate high temperature bond is formed. Thus, my process is fundamentally different from several prior art processes that entail the use of caustic to form a high temperature bond by a fluxing and/or sintering action.

The molecular sieve particles used in carrying out this invention are synthetic and naturally occurring crystalline metallo-aluminosilicates having zeolitic properties. Especially suitable are molecular sieves which in dehydrated form have uniform pore openings of at least 4 Angstrom units. Among the preferred synthetic molecular sieves may be mentioned the zeolites referred to as A, Y, L, D, R, S, T, Z, E, F, Q, B, X, ZK–4, Zeolite-alpha and ZK–5. Especially preferred are molecular sieves having uniform pore openings within the range of 6 to 15 Angstrom units, as exemplified by the synthetic molecular sieves known as X, Y, L, D and the naturally occurring molecular sieve faujasite. The composition and crystal structure of these and other molecular sieve type zeolites is described in the patent literature, including the several patents referred to hereinabove.

For purposes of economy, it is preferable to employ the molecular sieve crystals in the form in which they are synthesized, which is in the hydrated sodium-exchanged form for most molecular sieves. With naturally occurring molecular sieves, the sieve can be employed in the form in which it occurs in nature. In the case of faujasite, the naturally occurring zeolitic sieve contains a mixture of sodium and calcium in exchangeable positions. The sieves can be employed in fully hydrated, partially hydrated or substantially anhydrous condition. The crystals should be finely divided, i.e., substantially all of the particles should be passable through a 325 mesh Tyler screen. Usually the crystals will be predominantly finer than 30 microns and coarser than 2 microns (as determined by sedimentation.)

Substantially pure molecular sieve crystals can be used in formulating the composite catalyst. However, impurities either incident to the preparation of the molecular sieve or associated with the sieve particles in nature, can be present, even in substantial quantity. However, such impurities should be essentially inert toward the other ingredients and should not contain sodium or other alkali in nonexchangeable association.

As mentioned hereinabove, the clay material used in forming the matrix binder must be a halloysitic kaolin clay. The term "kaolin clay" refers to a clay composed predominately of crystalline hydrated aluminum silicates whose composition may be expressed by the composition $Al_2O_3 \cdot 2SiO_2 \cdot XH_2O$, wherein X is usually 2. A characteristic of such clay is that clay minerals composing it consist essentially of oxides of silicon, aluminum and water. Clay minerals outside the scope of this invention, such as sepiolite, attapulgite and montmorillonite, include metallic constituents other than alumina as essential ingredients. Species of minerals that predominate in kaolin clays are: kaolinite, anauxite, dickite, nacrite and halloysite. Kaolin clay containing halloysite as the sole or predominating mineral species can be used. Deposits of such clay are found around Eureka, Utah. For economic reasons, it may be preferable to use a clay containing halloysite mixed with other kaolin-type minerals, such as a kaolinite, halloysite mixture or a mixture of kaolinite-dickite and halloysite. Halloysite occurs in some deep kaolin deposits along with kaolinite in North Carolina, and its presence is attributed to weathering processes. Such a mixture of kaolinite and halloysite is available commercially as "Avery" clay, which is mined near Spruce Pine, N.C., and produces exceptionally good results. The halloysite can be of the endellitic variety (containing 4 mols of $H_2O$ per mole of $Al_2O_3 \cdot 2SiO_2$), or the more common dehydrate form of halloysite ($Al_2O_3 \cdot 2SiO_2 \cdot 2H_2O$) can be used. The endellitic variety of halloysite is converted irreversibly to the lower hydrate form by mild drying. For purposes of this invention, both hydrates are considered to be halloysite. Halloysite can be identified effectively by electronmicroscope and X-ray diffraction techniques. Methods for identifying the mineral halloysite are described in an article by L. T. Alexander et al. entitled, "Relationship of the Clay Minerals Halloysite and Endellite," appearing in The American Mineralogist, vol. 28, January 1943, No. 1, pp. 1 to 17.

The sodium hydroxide can be employed as a solution of 2% to 20% weight concentration. When the solution is too dilute, the amount of sodium hydroxide present with the clay may be inadequate to produce a significant improvement in the hardness of the catalyst. On the other hand, when the solution is excessively concentrated, some of the sieve crystals may be decomposed and catalysts of the desired catalytic properties may not be produced.

In preparing the catalyst, in accordance with this invention, I use from 1 to 25 parts by weight of molecular sieve to 99 to 75 parts by weight clay, on a dry weight basis. The quantity of alkali solution incorporated with the clays will vary with the particle size of the clay, moisture content of the clay and sieve, and with the method of agglomeration used. Typically, about 40 parts by weight of solution will be employed with about 100 parts of dry mixture of clay and sieve.

The mixing can be carried out in a pug mill, kneader, or cement mixer. A preferred method for agglomerating the mixture is carried out by extruding the mixture, as in a piston type extruder or an auger extruder, to form strands which can be chopped into pellets as they issue through the die plate in the extrusion equipment. Rotating pelletizing discs can also be used. With these discs, the alkali solution is added to the solid pulverulent ingredients while the discs is rotating and the solids gradually ball up into pellets of desired size. Other agglomeration methods can be used.

To form the desired green bond by reaction of alkali with the halloysitic kaolin clay, the agglomerates can be heated in air at a temperature within the range of 100° F. to 300° F. under atmospheric pressure for a time sufficient to make the agglomerates resistant to flaking upon treatment with base-exchange solution. The heating time will usually be within the range of from about 1 to 48 hours and will vary with the heating temperature. The heat treatment destroys the plasticity of the agglomerates since the ingredients set up into a mass of moderate hardness as a result of the treatment.

At this point of the process, the agglomerates are contacted with a solution, preferably an aqueous solution, containing nonalkali cations capable of replacing sodium present in the agglomerates. Especially when concentrated caustic has been used and there may be appreciable free (unreacted) sodium hydroxide in the pellets, it may be desirable to wash the agglomerates before carrying out the base-exchange reaction.

As mentioned, the sieve crystals can be exchanged with hydrogen ions, ammonium ions, metal cations of Group I-B through Group VIII of Periodic Table, and mixtures of the aforementioned. The ammonium and metal cations are preferably supplied in the form of chloride, nitrate, acetate and sulfate salts, although other salts can be used provided they are soluble in the ion-exchange medium and contain an anion which results in the formation of a soluble salt with the exchanged cations originally in the agglomerates. The preferred metals are divalent metals of Group II-A (the rare earth metals) and trivalent metals, especially aluminum. The rare earth salts can be used as the salt of a single rare earth metal, although usually mixtures of rare earth metals will be employed in the form of a mixture of rare earth chlorides containing lanthanum as the principal rare earth. As examples of salts of trivalent metals may be mentioned the following: aluminum chloride, aluminum bromide, aluminum acetate, aluminum citrate, aluminum nitrate, aluminum phosphate, aluminum sulfate, zirconium chloride, zirconium nitrate, zirconium sulfate, chromic acetate, chromic chloride, chromic nitrate and chromic sulfate. Inorganic and organic acids can be used as a source of hydrogen ions and the organic acids include aliphatic, aromatic, cycloaliphatic acids which can be mono-, di-, or polycarboxylic. Inorganic acids include hydrochloric and sulfuric. Ion exchange resins capable of providing hydrogen ions can also be used. It will be obvious to those skilled in the art that only those sieves which are acid stable can be exchanged directly with hydrogen ion by acid treatment. Sources of ammonium ion include ammonium chloride, bromide, iodide, sulfate, hydroxide, citrate, and tetraalkyl ammonium salts.

Ion-exchange treatment can be carried out at temperatures ranging from about 70° up to the temperature at which the molecular sieve is unstable. The exchange is usually carried out for a time sufficient to reduce the alkali metal oxide content to less than about 1% (based on the dry weight of the product). The time required to effect the desired degree of exchange will vary with the specific cations in the exchange solution, concentration of cations in the solution, exchange temperature, method of carrying out the exchange, size of the agglomerates. This time may range from an hour up to a week or more.

The salt concentration in typical ion-exchange solutions is within the range of from about 2% to about 25%, on a weight basis.

The following example is given to illustrate further my invention.

Ten parts by weight of commercial substantially pure, minus 325 mesh zeolite Y in the sodium-exchanged, hydrated form, is thoroughly blended in a ribbon blender with 90 parts by weight of dry Avery clay. The mixture is placed in a pug mill and while the pug mill is running, a 10% (weight basis) aqueous solution of sodium hydroxide is slowly added to the charge in the mill until the mixture has a plastic and extrudable consistency. After addition of sodium hydroxide solution is completed, pugging is continued for an additional 30 minutes. The contents of the pug mill are transferred to a worm-type extruder and extruded into cylindrical strands about ⅛″ in diameter. The strands are cut into pellets about ⅛″ long as they issue from the die plate of the extruder.

The pellets are transferred in open containers which are placed in a muffle furnace maintained at 250° F. The pellets are held in the oven for 2 hours and permitted to cool to room temperature. The cooled pellets, which are firm and have substantial green strength, are washed thoroughly with water and then exchanged at 180° F. with $1NNH_4NO_3$ solution by continuously percolating the solution through batches of the pellets until the $Na_2O$ contents of the effluents are below 0.05%. The pellets are then activated and hardened by calcining the pellets in an air atmosphere at 1200° F. for one hour.

I claim:

1. A method for making mechanically strong composite catalyst agglomerates which comprises mixing a small amount of finely divided synthetic crystalline molecular sieve with a substantially larger amount of hydrated halloysitic kaolin clay, tempering the mixture to a plastic consistency by adding sodium hydroxide solution, forming the mixture into agglomerates, partially hardening the agglomerates by heating them at a temperature ranging from 100° F. to 300° F., removing a substantial amount of the sodium content of the agglomerates by ion-exchanging the agglomerates with a solution of salt containing nonalkali metal ions capable of replacing sodium ions in the agglomerates, and further hardening and activating the agglomerates by calcining them at a temperature of at least about 1000° F. and below which the molecular sieve is unstable.

2. The method of claim 1 in which said clay is Avery clay.

3. A method for making mechanically strong catalyst agglomerates which comprises forming a mixture containing a minor weight percent of finely divided crystals of a synthetic molecular sieve having uniform pore openings within the range of 6 to 15 Angstrom units, a major weight percent, as compared to the quantity of said molecular sieve crystals, of a hydrated clay of the kaolin type and including a substantial amount of halloysite, and sodium hydoxide of 2% to 20% weight concentration in amount sufficient to temper solids in the mixture and to form a mass having a consistency amenable to extrusion, extruding the mixture, heating the extrudate at a temperature of 100° F. to 300° F. under atmospheric pressure for a time sufficient to make the agglomerates resistant to slaking upon treatment with base-exchange solution, contacting the agglomerates with a solution of a salt of a nonalkali cation to effect substantial exchange of the sodium present in the agglomerates with cations of said salt and activating and hardening the agglomerates by calcining them at a temperature within the range of about 1000° F. to about 1700° F.

4. The method of claim 3 in which said clay is Avery clay.

5. A composite catalyst in the form of mechanically strong agglomerates comprising micron-size particles of a crystalline molecular sieve having nonalkali metal cations associated therewith and, as a matrix therefor, a material obtained by forming an agglomerated mixture of hydrated halloysitic kaolin clay, aqueous sodium hydroxide solution and finely divided particles of zeolitic molecular sieve, reacting said hydrated clay with said sodium hydroxide in said agglomerates at a temperature within the range of 100° F. to 300° F., removing sodium ions from the reaction product by base-exchange with non-alkali metal cations, and dehydrating the clay and activating said sieve by heating said agglomerates at a temperature within the range of about 1000° F. to about 1700° F.

References Cited

UNITED STATES PATENTS

| | | |
|---|---|---|
| 2,973,327 | 2/1961 | Mitchell et al. _____ 252—455 XR |
| 3,037,843 | 6/1962 | Mason _____ 23—112 |
| 3,119,660 | 1/1964 | Howell et al. _____ 23—112 |
| 3,234,147 | 2/1966 | Drost et al. _____ 252—455 |
| 3,291,754 | 12/1966 | Hanisch et al. _____ 252—455 |

DANIEL E. WYMAN, *Primary Examiner.*

C. F. DEES, *Assistant Examiner.*